United States Patent [19]

Merritt

[11] Patent Number: 4,903,920
[45] Date of Patent: Feb. 27, 1990

[54] CABLE CLIP

[76] Inventor: James A. Merritt, P.O. Box 206, Pleasanton, Calif. 94566

[21] Appl. No.: 185,017

[22] Filed: Apr. 22, 1988

[51] Int. Cl.$^4$ ............................................... F16L 3/04
[52] U.S. Cl. ..................................... 248/71; 248/547; 248/74.5; 24/457
[58] Field of Search ................ 248/71, 544, 546, 547, 248/DIG. 9, 74.5, 68.1; 174/164, 166 R, 159; 24/317, 351, 457

[56] References Cited

U.S. PATENT DOCUMENTS

| | | | |
|---|---|---|---|
| 2,961,210 | 11/1960 | Pfaff et al. | 248/71 X |
| 3,491,972 | 1/1970 | Townshend | 248/71 |
| 3,951,367 | 4/1976 | Hagelberg | 248/71 |
| 4,588,152 | 5/1986 | Ruehl et al. | 248/74.5 X |

FOREIGN PATENT DOCUMENTS

| | | | |
|---|---|---|---|
| 1077284 | 3/1960 | Fed. Rep. of Germany | 248/71 |
| 1206504 | 12/1965 | Fed. Rep. of Germany | 174/157 |
| 8503560 | 8/1985 | PCT Int'l Appl. | 248/71 |
| 1315952 | 5/1973 | United Kingdom | 248/74.5 |
| 2099289 | 12/1982 | United Kingdom | 248/62 |

Primary Examiner—Ramon S. Britts
Assistant Examiner—Karen J. Chotkowski
Attorney, Agent, or Firm—Townsend and Townsend

[57] ABSTRACT

A clip (2) for retaining coaxial type cable (4) against a mounting surface (6) means of a nail (8) similar fastener may be produced by an extrusion process. The clip has an upper surface (18) having a first nail slot (26), and has a lower surface (20) with a second nail slot (36) and a cable retaining opening (50). The first nail slot is situated above the second nail slot and a slot separation wall (44) is defined therebetween. The cable is inserted in the cable retaining opening and the clip is placed against the mounting surface. The fastener is then driven through the first nail slot, through the slot separation wall, through the second nail slot and into the mounting surface. The first and second nail slots have widths about 90%-110% of the diameter of the fastener, and the slot separation wall has a thickness of about 75%-150% of the diameter of the fastener. The depth of the second nail slot is chosen accommodate any flashing (52) produced as the fastener is driven through the slot separation wall.

9 Claims, 1 Drawing Sheet

U.S. Patent  Feb. 27, 1990  4,903,920
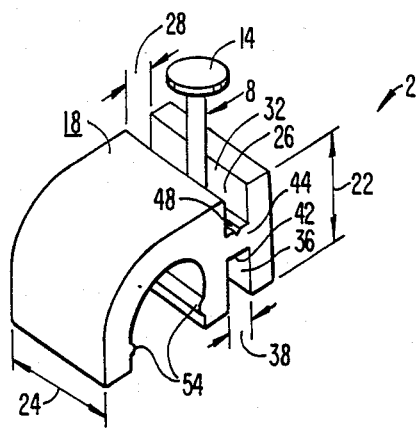
FIG._3.
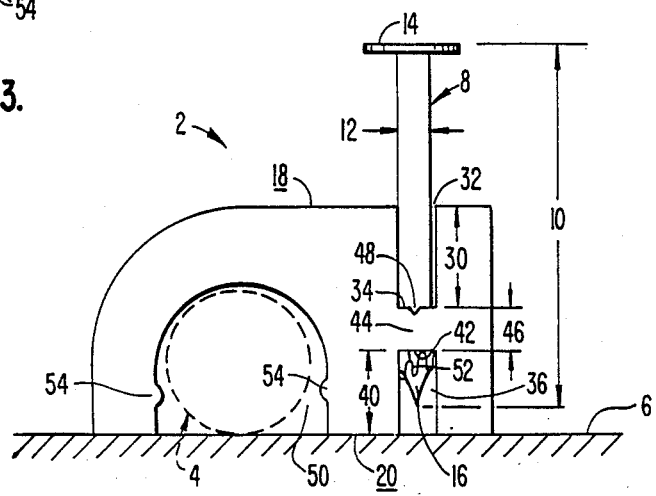
FIG._1.
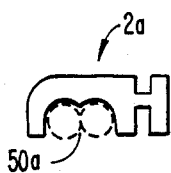
FIG._2a.
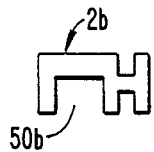
FIG._2b.
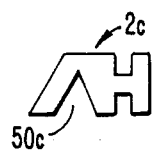
FIG._2c.

CABLE CLIP

BACKGROUND OF THE INVENTION

The invention relates to clips that retain cables, such as coaxial cables, against a mounting surface by means of a nail or similar fastener.

Clips for retaining cables against a mounting surface are known in the art. Typically such clips are used to retain TV or telephone cables against a mounting surface such as a floor, a wall, or a roof surface. The clip is generally attached by driving a nail or similar fastener through a hole in the clip and then into the mounting surface.

In the prior art, such clips are most frequently made from plastic using an injection molding process. Injection molding is, at least initially, a relatively expensive process to implement because molds are very expensive, often costing $20,000 to $30,000, and sometimes even more. Cables come in a variety of sizes and shapes, and a manufacturer who wishes to produce a complete line of clips for holding a variety of cable sizes may have to purchase ten or more expensive molds.

Frequently the clips are used on external walls or roofs, thereby exposing the clips to radiation from the sun and wide variations in temperature. Because injection molded clips are made of plastic, they are subject to depolymerization and other types of structural degradation. Exposure to sunlight and elevated temperatures can accelerate the degradation of the plastic clips.

The injection molded plastic clips suffer from further disadvantages. The hole for the mounting nail is manufactured during the molding process and the clips are commonly sold with a nail pre-inserted into the hole. During cable installation, the nail is hammered part way through the clip and into the mounting surface. Because the clip is plastic, great care must be exercised while hammering. Should the installer hammer the nail too hard or accidentally strike the clip instead of the nail head, the plastic clip may fracture and the cable within the clip may be damaged from the hammer's blow. In some instances the cable may have been damaged from the hammer's blow but will appear to be undamaged, until some later date when the TV or telephone equipment is connected to the cable and found not to work properly. The cable installer must then return to the job site, determine the source of the problem and, upon locating the source, replace the cable that was damaged during installation.

Another type of prior art cable clip is fabricated from a strip of bent metal shaped somewhat like the number 5. The cable is retained in the rounded portion of the 5 and the nail is driven diagonally through the top of the 5, through the vertical portion of the 5 and into the mounting surface. Holes are formed in the metal clip during fabrication so the nail can be pre-inserted into the nail holes in the clip prior to installation. Because the metal clip is relatively flimsy, careless hammering can bend the clip out of shape, with resultant damage to the cable.

SUMMARY OF THE INVENTION

The present invention provides a cable clip that may be manufactured by an extrusion process. An extrusion process is advantageous in that an extrusion die to produce a cable clip is much cheaper (about 50 times cheaper) than a die used for injection molding. For example, a manufacturer wishing to produce a line of, say, ten differently sized clips for retaining different sized cables may face a total outlay of about $5,000. In contrast, the cost for the injection molds for that number of clip sizes could well cost about $200,000 to $300,000.

The extruded clip may be fabricated from many materials including metal and plastic. Extruding the cable clip from metal, typically aluminum, produces a clip which is weather resistant, has great strength and is resistant to damage by hammering.

The cable clip is extruded in a shape that has an upper surface with an upper nail slot, a lower surface with a lower nail slot and a cable retaining opening. The upper nail slot is above the lower nail slot, and the two nail slots are separated by a slot separation wall. The width of the upper and lower nail slots is, in a preferred embodiment, 90% to 110% of the diameter of the nail or similar fastener that is used to retain the clip against a mounting surface. The term nail will be used hereafter, but it is understood that any axially driven elongate fastener, such as a brad or screw, may be used instead. A case-hardened fastener is preferred for its increased strength.

The slot separation wall has, in a preferred embodiment, a thickness of about 75% to 150% of the diameter of the nail. The precise thickness will depend upon various factors, including the diameter and material characteristics of the nail and the surface characteristics of the clip.

In practice, a mounting clip having the above described characteristics is extruded from aluminum, and the extruded material is cut at a length equal to the desired body length of the cable clip. The nail is then forced through the upper nail slot, through the slot separation wall and through substantially all of the lower nail slot during the manufacturing process.

As the pointed end of the nail forces its way through the slot separation wall and into the lower nail slot, the material being displaced by the emerging nail, which material will be referred to as flashing, is forced into the lower nail slot. The height of the lower nail slot is selected to allow the lower nail slot to readily accommodate all of the flashing that results from the nail entering the slot separation wall.

During installation, the cable to be retained is placed in the cable retaining opening, and the lower surface of the clip is held against the mounting surface. The already inserted nail is then hammered into the mounting surface until the head of the nail is substantially even with the upper surface of the clip. Because the clip is aluminum, it will not deteriorate, and will not break should the hammer strike the nail too hard or miss the nail and strike the cable clip directly. The cable clip and the cable itself are thus protected.

It is an objective of the invention to produce a cable clip by means of a process requiring minimal outlay of capital, yet capable of producing a cable clip that may be made of metal, thus avoiding the problems caused by exposure to the sun and temperature extremes.

It is an additional objective of the invention to produce a cable clip of sufficiently rugged design to withstand the accidental blow of a hammer during installation without damaging the clip or the cable.

Other objects, features and advantages of the invention will appear from the following description in which the preferred embodiment has been set forth in detail in conjunction with the accompanying drawing.

BRIEF DESCRIPTION OF THE DRAWINGS

FIG. 1 is an end view of a mounting clip produced according to the present invention with a nail pre-inserted therein.

FIG. 2(a) is an end view of a mounting clip produced according to the present invention that includes a double tunnel-shaped cable retaining area.

FIG. 2(b) is an end view of a mounting clip produced according to the present invention that includes a rectangular-shaped cable retaining area.

FIG. 2(c) is an end view of a mounting clip produced according to the present invention that includes a triangular-shaped cable retaining area.

FIG. 3 is an isometric view of the clip of FIG. 1.

DETAILED DESCRIPTION OF THE PREFERRED EMBODIMENT

FIGS. 1 and 3 show a cable clip 2 that retains a cable 4 against a mounting surface 6 by means of an axially driven elongate fastener 8 such as a nail. Clip 2 is preferably made from extruded aluminum, but could be made from other materials as well. Fastener 8, has a length 10, a diameter or transverse dimension 12, a head 14 and a pointed end 16.

Cable clip 2 has an upper surface 18, a lower surface 20, a height 22 and a body length 24. Upper surface 18 includes a first nail slot 26 having a first slot width 28, a first slot depth 30, a first slot top 32 and a first slot bottom 34.

Lower surface 20 includes a second nail slot 36 which has a second slot width 38, a second slot depth 40 and a second slot bottom 42. As shown in FIG. 1, the first nail slot 26 is situated above second nail slot 36 and there is defined therebetween a slot separation wall 44 having a thickness 46. First slot bottom 34 may include a groove 48 to facilitate the insertion of the fastener 8 during the process of manufacturing cable clip 2, as is discussed below.

Width 28 of first nail slot 26 and width 38 of second nail slot 36 are preferably each selected to be about 90% to 110% of diameter 12 of fastener 8. Doing so helps to center fastener 8 in slot 26. Further, thickness 46 of slot separation wall 44 is selected to be about 75% to 150% of diameter 12 of fastener 8. This distance is chosen depending upon a number of factors including the strength and diameter of fastener 8, the size of clip 2, the type of fastener 8 used, and so forth.

A mounting clip having the above described characteristics can be extruded, preferably from aluminum, since the features do not vary along body length 24 of clip 2. The extruded material is cut at a length equal to body length 24 of the clip 2. Pointed end 16 of fastener 8 is then driven through first nail slot 26 and through slot separation wall 44 until pointed end 16 of fastener 8 passes through wall 44. As pointed end 16 of fastener 8 penetrates slot separation wall 44, a certain amount of flashing 52 will be displaced downward into second nail slot 36. Depth 48 of second slot 36 is selected such that second slot 36 can accommodate all of flashing 52 that is produced. This keeps flashing 52 from interfering with the proper placement of the clip 2 firmly against the mounting surface 6 by the user.

Lower surface 20 defines a cable retaining opening 50 that is sized for housing cable 4. One or more ridges 54 may be formed in the opening 50 to aid retention of the cable 4. Although FIG. 1 shows a tunnel-shaped cable retaining opening 50, opening 50 may define other shapes as well. FIG. 2(a) illustrates a cable clip 2a defining a double tunnel-shaped cable retaining opening 50a. FIG. 2(b) illustrates a cable clip 2b having a rectangular-shaped cable retaining opening 50b. FIG. 2(c) illustrates a cable clip 2c having a triangular-shaped cable retaining opening 50c.

In use, the cable installer places cable 4 into cable retaining opening 50 of cable clip 2, places cable clip 2 firmly against the mounting surface 6 and then hammers head 14 of the pre-inserted fastener 8 until fastener head 14 is against upper surface 18.

Modifications and variations may be made to the disclosed embodiments without departing from the subject of the invention as defined by the following claims. While the cable clip has been discussed with regard to installation of coaxial type TV or telephone cable, the invention would be suitable for installation of other signal carrying cable as well, including fiber optic cable.

What is claimed is:

1. A clip assembly for retaining a cable against a mounting surface comprising:
   an elongate fastener having a length and a transverse dimension; and
   a clip including:
   a body having an upper surface, a lower surface and a body length;
   said upper surface defining a first slot having a first slot width, a first slot depth and a first slot bottom;
   said lower surface defining a cable retaining opening sized for receipt of the cable;
   said lower surface further defining a second slot having a second slot width, a second slot depth and a second slot bottom, said first and second slot bottoms defining a slot separation wall therebetween;
   said elongate fastener being constricted within said slot separation wall as a result of being driven therethrough; and
   flashing extending into said second slot as a result of the fastener being driven through the slot separation wall.

2. A clip according to claim 1, wherein said first slot width is about 90% to 110% of the transverse dimension of the elongate fastener.

3. A clip according to claim 1, wherein said second slot width is about 90% to 110% of the transverse dimension of the elongate fastener.

4. A clip according to claim 1, wherein said slot separation wall has a thickness about 75% to 150% of the transverse dimension of the elongate fastener.

5. A clip according to claim 1, wherein said second slot depth is sufficient to accommodate all of said flashing.

6. A clip according to claim 1, wherein said cable retaining opening includes a ridge adapted to engage the cable.

7. A clip according to claim 1, wherein said body is aluminum.

8. A clip according to claim 1, wherein said body is plastic.

9. A clip assembly for retaining a cable against a mounting surface comprising:
   an elongate fastener, having a length and a transverse dimension;
   a body having an upper surface, a lower surface and a body length;

said upper surface defining a first slot having a first slot width, a first slot depth and a first slot bottom;
said lower surface defining a cable retaining opening sized for receipt of the cable; and
said lower surface further defining a second slot having a second slot width, a second slot depth and a second slot bottom, said first and second slot bottoms defining a slot separation wall therebetween, said slot separation wall having a thickness about 75% to 150% of the transverse dimension of the elongate fastener and being adapted for being penetrated by the elongate fastener.

* * * * *